UNITED STATES PATENT OFFICE.

SIDNEY G. THOMAS, OF QUEENS ROAD VILLAS, COUNTY OF SURREY, ENGLAND.

IMPROVEMENT IN MANUFACTURE OF BESSEMER STEEL.

Specification forming part of Letters Patent No. 217,495, dated July 15, 1879; application filed April 16, 1879.

*To all whom it may concern:*

Be it known that I, SIDNEY GILCHRIST THOMAS, of Queens Road Villas, in the county of Surrey, England, have invented a new and useful process for the more complete elemination of the phosphorus contained in phosphoritic pig-iron, when such pig-iron is being employed in the manufacture of Bessemer steel, the said process being fully set forth in the following specification.

This invention relates to an improved process in the manufacture of Bessemer steel from phosphoritic pig-iron; and the invention consists in dephosphorizing the metal in a basic-lined vessel, with the addition of lime or lime and iron ore, to form a highly basic earthy slag, by continuing the blast for about from one to six minutes after the disappearance of the carbon-lines of the flame, and until there is emitted from the chimney copious brown smoke and a white smoke appears around the edge of the flame, as hereinafter particularly set forth.

In order to effect the more complete removal of phosphorus in the manufacture of Bessemer steel from phosphoritic pig-iron, I adopt the following process: I use a converter lined with a basic material, preferably of the kind already described by me in previous applications, and I cause a highly basic earthy slag to be produced—a condition which I have also before described as essential to the removal of phosphorus. I now find that this slag should contain a minimum of thirty-six per cent. of lime and magnesia, and that in combination therewith a considerable "after-blow" is necessary for the most technically economical results.

In carrying out my process I proceed as follows: Immediately before the metal is introduced into the converter I throw into the converter an amount of lime, (preferably magnesian lime,) or of a mixture of about eight parts of lime to one of iron ore, (prepared as hereinafter described,) equal in weight to nearly twice the weight of the silicon and phosphorus together contained in the charge. I then blow for about from seven to ten minutes, or for whatever time experience shows is necessary for giving enough heat to enable the rest of the addition to be advantageously made, which generally amounts to half the average duration of the blow. I have found it best to use for blowing large tuyere-holes of from three-quarters ($\frac{3}{4}$) of an inch to one (1) inch diameter.

The converter is turned down, and about the same weight or a somewhat smaller amount than was first added of about two parts of lime to one part of iron oxide, such as non-silicious hematite or purple ore is thrown in. The exact amount of this basic addition is regulated by the character of the converter-bottom.

If the bottom wears away very little, a larger quantity of base will be required to be added, and vice versa, the object being always to get a slag with over thirty-six per cent. of lime and magnesia, and from ten to twenty-two per cent. of silica. I prefer that this addition should be very hot, or even molten. It may be conveniently heated in the converter flame, as spiegel is sometimes now heated. The mixture may be conveniently made by taking about four parts of non-silicious magnesian limestone and one of oxide of iron, mixing them together and making the mixture into rough bricks or balls, which are then highly calcined or melted in a furnace or kiln, and thrown hot into the converter.

If the pig treated is high in manganese, the proportion of iron ore in this mixture may be reduced considerably, and if very much manganese is present even lime alone may be used. After the addition the converter is rapidly turned up and the blow continued.

The blow is not, however, stopped, as is now the invariable practice when, or within fifty seconds of the time when, the flame drops and the carbon-lines (or, as they are sometimes called, the "oxide-of-manganese" lines) of the spectrum, as seen by the spectroscope, disappear, but is continued for from one minute to six minutes after the disappearance of such lines, and until there appears from the chimney of the converter copious brown smoke, and also a well-defined white smoke around the edge of the flame. The duration of the after-blow will generally be from one-fourth ($\frac{1}{4}$) to one-sixth ($\frac{1}{6}$) the length of the ordinary blow up to the point when the carbon-lines disappear; but this depends on the amount of phosphorus originally present. As a check on the smoke indication until the blower is accustomed to it, a sample may be taken from the converter after the smoke appears and hammered after cooling in water to ascertain if the phosphorus is gone. If the metal is hard, the vessel is turned up and the blow is continued. The converter is then turned down and the spiegel added in the usual way. As the Bessemer process is at present conducted, as is well known, if the converter is not turned down and the blow stopped when the flame drops and the carbon-lines disappear, a considerable loss of metal is caused, while the phosphorus is not removed. Great care is therefore taken to turn down the vessel when the flame drops.

I find, however, that by using a basic lining and large basic additions, so as to produce a highly basic earthy slag, in the manner described when blowing a phosphoritic pig-iron, (by which I generally mean a pig-iron containing over four-tenths ($\frac{4}{10}$) per cent. of phosphorus, though my process is more specially applicable to pig containing over eight-tenths ($\frac{8}{10}$) per cent. of phosphorus,) not only may the metal be "after-blown" in the manner herein described without injury or waste to the metal, which, under these circumstances, and in the presence of a basic slag, is protected by the phosphorus, but with the greatest advantage in securing the more complete dephosphorization of the steel.

I do not claim as this invention the use alone of basic linings and large basic additions, the general utility of which I have described in prior applications; but

What I claim is—

The herein-described process of dephosphorizing metal in the manufacture of Bessemer steel, consisting in blowing the metal in a converter or other vessel lined with basic material and containing basic material, such as lime or a mixture of lime and iron ore, to form a basic slag, and continuing the blow for from about one to six minutes after the disappearance of the carbon-lines, and until the chimney emits copious brown smoke and the flame is edged with white smoke, substantially as specified.

SIDNEY GILCHRIST THOMAS.

Witnesses:
PHILIP M. JUSTICE,
ALLEN BARRY JONES.